(12) United States Patent
Ait Bouziad et al.

(10) Patent No.: US 11,510,521 B2
(45) Date of Patent: Nov. 29, 2022

(54) DISPOSABLE FOAMING DEVICE

(71) Applicant: NESTEC S.A., Vevey (CH)

(72) Inventors: Youcef Ait Bouziad, Echandens (CH); Fabien Ludovic Agon, Blonay (CH); Andre Noth, Pully (CH); Gregory Savioz, Miege (CH)

(73) Assignee: Societe des Produits Nestle S.A., Vevey (CH)

( * ) Notice: Subject to any disclaimer, the term of this patent is extended or adjusted under 35 U.S.C. 154(b) by 310 days.

(21) Appl. No.: 15/320,077

(22) PCT Filed: Jun. 22, 2015

(86) PCT No.: PCT/EP2015/063897
§ 371 (c)(1),
(2) Date: Dec. 19, 2016

(87) PCT Pub. No.: WO2015/197505
PCT Pub. Date: Dec. 30, 2015

(65) Prior Publication Data
US 2018/0206670 A1  Jul. 26, 2018

(30) Foreign Application Priority Data

Jun. 25, 2014 (EP) .................................... 14173790

(51) Int. Cl.
*A47J 31/44* (2006.01)
*B67D 1/10* (2006.01)

(52) U.S. Cl.
CPC ....... *A47J 31/4485* (2013.01); *A47J 31/4496* (2013.01); *B67D 1/10* (2013.01)

(58) Field of Classification Search
CPC .......... B01F 2215/0021; B01F 3/04269; B01F 3/04453; B01F 5/0451; B01F 5/0476;
(Continued)

(56) References Cited

U.S. PATENT DOCUMENTS 4,620,953 A * 11/1986 Silla ........................ A01J 13/00
261/142
4,993,597 A * 2/1991 Evers ................... B67D 1/0047
222/145.6
(Continued)

FOREIGN PATENT DOCUMENTS

CN         1853545 A     11/2006
CN       101511237 A      8/2009
(Continued)

*Primary Examiner* — Jimmy Chou
*Assistant Examiner* — Tiffany T Tran
(74) *Attorney, Agent, or Firm* — K&L Gates LLP

(57) ABSTRACT

Disposable foaming device (100) for foaming a fluid (1) comprising a container compartment (20) and a foaming compartment (10), the container compartment (20) being pressurized by primary incoming air (14') so that the fluid (1) is driven into the foaming compartment (20), wherein the foaming compartment (20) is provided with secondary incoming air (15') to be mixed with the fluid (1) coming from the container compartment (20), the foaming compartment (10) being designed in such a way that the mixture of air and fluid (1) is moved under certain level of shear stress calculated so that it allows the mixture of air and fluid (1) to be emulsified in the foaming compartment (10). Typically, the foaming compartment (20) comprises an inner cylinder (11) and an outer cylinder (12), the inner cylinder (11) and the outer cylinder (12) being arranged concentrically so that a gap (13) is formed between them, the inner cylinder (11) being rotatable with respect to the outer cylinder (12), such that the mixture of fluid (1) and air is emulsified when driven through the gap (13).

18 Claims, 11 Drawing Sheets

(58) Field of Classification Search
CPC ........ B01F 7/008; B01F 7/00816; B01F 7/12;
B01F 2003/04404; B67B 7/28; B67D
1/0007; B67D 1/0037; B67D 1/0044;
B67D 1/0046; B67D 1/0079; B67D
1/0847; B67D 1/10; B67D 1/1275; B67D
2001/0811; B67D 2001/0817; B67D
1/0004; A47J 31/4485; A47J 31/46; A47J
36/28; A47J 27/004; A47J 31/4496; A47J
43/0465; A47J 2202/00; A47J 27/21041;
A47J 31/4489; A47J 31/44; A47J 31/401;
A47J 31/605; A47J 43/12; A23C 3/031;
A23C 9/1524; A23C 7/00; A47K 5/1211;
A47K 5/14; B05B 7/0025; B05B 7/0037;
B05B 9/0816
USPC ...... 99/323.1, 452, 453, 275, 291, 283, 285,
99/286, 483, 302 R, 460, 293, 307;
222/1, 189.08, 190, 566, 145.5, 207, 209,
222/401, 631; 426/474; 417/118
See application file for complete search history.

(56) References Cited

U.S. PATENT DOCUMENTS

| | | | | | |
|---|---|---|---|---|---|
| 5,297,472 | A | * | 3/1994 | Suzuki | A47J 31/408 |
| | | | | | 99/289 T |
| 5,727,713 | A | * | 3/1998 | Kateman | A23G 9/04 |
| | | | | | 222/145.6 |
| 10,028,613 | B2 | * | 7/2018 | Ait Bouziad | A47J 31/4485 |
| 2001/0002891 | A1 | * | 6/2001 | Frankel | A47J 43/0716 |
| | | | | | 366/146 |
| 2002/0144602 | A1 | * | 10/2002 | Taylor | A47J 31/465 |
| | | | | | 99/295 |
| 2003/0006281 | A1 | * | 1/2003 | Thomas | G07F 13/065 |
| | | | | | 235/385 |
| 2004/0009281 | A1 | * | 1/2004 | Green | A47J 31/4485 |
| | | | | | 426/590 |
| 2007/0207232 | A1 | * | 9/2007 | Nelson | A23G 1/208 |
| | | | | | 425/4 R |
| 2007/0241137 | A1 | * | 10/2007 | Willis | B05B 7/0483 |
| | | | | | 222/190 |
| 2008/0008806 | A1 | * | 1/2008 | Boussemart | A47J 27/004 |
| | | | | | 426/519 |
| 2008/0166463 | A1 | * | 7/2008 | Green | B01F 3/04808 |
| | | | | | 426/474 |
| 2008/0245239 | A1 | * | 10/2008 | Fischer | A47J 31/401 |
| | | | | | 99/323.3 |
| 2009/0145926 | A1 | * | 6/2009 | Klopfenstein | B67D 1/0031 |
| | | | | | 222/129.4 |
| 2009/0285955 | A1 | * | 11/2009 | Crow | A47J 31/401 |
| | | | | | 426/474 |
| 2009/0323459 | A1 | * | 12/2009 | Windhab | B01F 7/12 |
| | | | | | 366/105 |
| 2010/0075007 | A1 | * | 3/2010 | Schindler | A47J 31/4485 |
| | | | | | 426/474 |
| 2010/0193544 | A1 | * | 8/2010 | Rusch | B67B 7/28 |
| | | | | | 222/82 |
| 2010/0212580 | A1 | * | 8/2010 | Kawazoe | C30B 15/04 |
| | | | | | 117/19 |
| 2013/0189405 | A1 | * | 7/2013 | Filliol | A47J 31/52 |
| | | | | | 426/231 |
| 2013/0209639 | A1 | * | 8/2013 | Larson | A47J 31/4496 |
| | | | | | 426/474 |
| 2013/0233441 | A1 | * | 9/2013 | Ciavarella | A47K 5/1211 |
| | | | | | 141/18 |
| 2014/0197554 | A1 | * | 7/2014 | Bonsch | A47J 31/4485 |
| | | | | | 261/37 |
| 2015/0024103 | A1 | * | 1/2015 | Bronnimann | A47J 31/4485 |
| | | | | | 426/474 |
| 2015/0305549 | A1 | * | 10/2015 | Perentes | A47J 31/4485 |
| | | | | | 426/474 |

FOREIGN PATENT DOCUMENTS

| | | |
|---|---|---|
| CN | 101641040 A | 2/2010 |
| CN | 102316776 A | 1/2012 |
| EP | 2383553 | 11/2011 |
| EP | 2478804 | 7/2012 |
| WO | 2006122916 A1 | 11/2006 |

* cited by examiner

DISPOSABLE FOAMING DEVICE

CROSS REFERENCE TO RELATED APPLICATIONS

The present application is a National Stage of International Application No. PCT/EP2015/063897, filed on Jun. 22, 2015, which claims priority to European Patent Application No. 14173790.8, filed Jun. 25, 2014, the entire contents of which are being incorporated herein by reference.

FIELD OF THE INVENTION

The present invention is directed to a device for foaming a fluid, preferably for foaming a food fluid product and, more preferably, for producing milk foam. In particular, the invention is directed to a disposable foaming device producing very high quality fluid foam in a controlled and reliable manner, requiring no cleaning operations.

BACKGROUND OF THE INVENTION

Foams consist of two phases, an aqueous phase and a gaseous (air) phase. A fluid foam is therefore a substance which is formed by trapping many gas bubbles in a fluid structure: producing a fluid foam involves not only the generation of these gas bubbles, but also the packing and the retention of these bubbles into the overall fluid structure in order to provide a stable foam.

Fluid foams produced from food fluid products are used in many different kinds in cooking, as they have a unique light texture because of the tiny air bubbles providing a different mouth feel. In most of these products which are foamed, proteins are the main surface active agents helping in the formation and stabilization of the dispersed gaseous phase, creating protein-stabilized foams. Proteins will always have certain stresses to overcome, such as mechanical and gravitational: the capacity of proteins to stabilize the foaming structure formed against these stresses will determine foam stability, usually expressed as the time required for 50% of the fluid to drain from the foam, i.e., the time required for reaching a 50% reduction in the foam volume.

When foaming a fluid, the main difficulties to be faced are to produce the foam desired in a controlled and repeatable way and also to stabilize the foam and to keep it stable for a given period of time.

One of the most commonly used food fluid foams is milk foam. Devices for producing milk foam are well known in the state of the art: typically, these devices comprise a reservoir, into which milk is filled, the reservoir being also provided with a rotating part, typically a whisk arranged in its lower surface, causing the foaming of the milk by agitating the milk which in turn traps air inside the liquid film. The production of milk foam in these known devices requires however time, quite a number of manipulations and also requires cleaning every time foam is produced. Also, in order to regulate the characteristics of the foam obtained, the geometry of the whisk needs to be controlled, something which is hard to understand and control in a precise way.

Document EP 2478804 A1 in the state of the art, for example, discloses a milk reservoir pressurized by gas, the pressurized milk being directed to a mixing area for being further mixed with another gas. Later frothing and reduction of the size of bubbles occurs in a frothing arrangement, comprising typically a static mixer or a rotating whisk. However, the regulation and control of the foaming in such systems is complicated and not precise, also requiring a complex configuration. Moreover, these systems require cleaning after foaming has been produced, which is both cumbersome and time consuming.

Other documents known in the state of the art, such as US 2013/0043274 A1, describe packaging solutions providing storing, dosing and dispensing functions particularly adapted for food fluid products, typically beverages, comprising a container, dosing means and a valve. The dosing means comprise a rotor with at least a truncated part driven in rotation and working as a dosing device, taking liquid from a dosing inlet and driving it to a dosing outlet, such that the liquid from the container is conveyed into a mixing chamber where it is mixed with a diluent: when this diluent is gas ($N_2$ or $CO_2$) a head of foam is provided on the upper layer of the beverage. However, the foaming process in this system is not produced in a controlled and precise way, being very difficult to monitor and to regulate it.

Accordingly, other solutions have been provided to allow the production of foaming fluids in a controlled and regulated manner. An example is provided in EP 12199185.5 belonging to the same applicant, where a device for producing milk foam is disclosed: high shear stress is applied to a milk-air mixture in the gap between two cylinders rotating with respect to each other, the shear stress leading to an emulsion of the milk and the air, with a later foaming effect once expansion occurs. With this solution, milk foam can be produced in a controlled way. However, the device is relatively complex and requires frequent cleaning after milk foam has been produced, something which is time consuming and not attractive for the user.

There is still a need to provide a simple device for generating high quality fluid foam in a controlled and regulated manner, and requiring no cleaning operations. The present invention aims at providing a solution towards these needs.

SUMMARY OF THE INVENTION

According to a first aspect, the present invention is directed to a disposable foaming device 100 for foaming a fluid 1 comprising a container compartment 20 and a foaming compartment 10, the container compartment 20 being pressurized by primary incoming air 14' so that the fluid 1 is driven into the foaming compartment 20. The foaming compartment 20 is provided with secondary incoming air 15' to be mixed with the fluid 1 coming from the container compartment 20, the foaming compartment 10 comprising two parts movable with respect to each other such that the mixture of air and fluid 1 is driven in between under certain level of shear stress so that it allows the mixture of air and fluid 1 to be emulsified in the foaming compartment 10.

Preferably, the foaming compartment 20 comprises an inner cylinder 11 and an outer cylinder 12, the inner cylinder 11 and the outer cylinder 12 being arranged concentrically so that a gap 13 is formed between them, the inner cylinder 11 being rotatable with respect to the outer cylinder 12, such that the mixture of fluid 1 and air is emulsified when driven through the gap 13. Also preferably, the width of the gap 13 is chosen as a function of the fluid 1 to be foamed, such that the shear stress in the gap 13 emulsifies optimally the mixture of air and fluid 1.

According to a second aspect, the invention refers to a foaming system comprising a foaming device 100 and a machine 30, the foaming device 100 being connectable to the machine 30. The machine 30 comprises driving means 31 moving the foaming compartment 10, a primary air pump 34 providing primary incoming air 14' and a secondary air pump 35 providing secondary incoming air 15'.

Preferably, the machine 30 monitors at least one or a combination of the following foaming process parameters: fluid flow rate flowing from the container compartment 20 into the foaming compartment 10, moving speed of the foaming compartment 10, flow of secondary incoming air 15' provided into the foaming compartment 10, temperature of the mixture of air and fluid 1 in the foaming compartment 10.

Preferably, the machine 30 comprises control means 36 and the foaming device 100 comprises a code 40 with information on at least one or a combination of the foaming process parameters, such that the control means 36 regulate automatically these foaming process parameters according to the information in the code 40. Another possibility is that the user manually regulates and acts on these parameters directly over the machine 30.

In the present description, the term "fluid" means a liquid or a mixture of liquid and gas.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1:
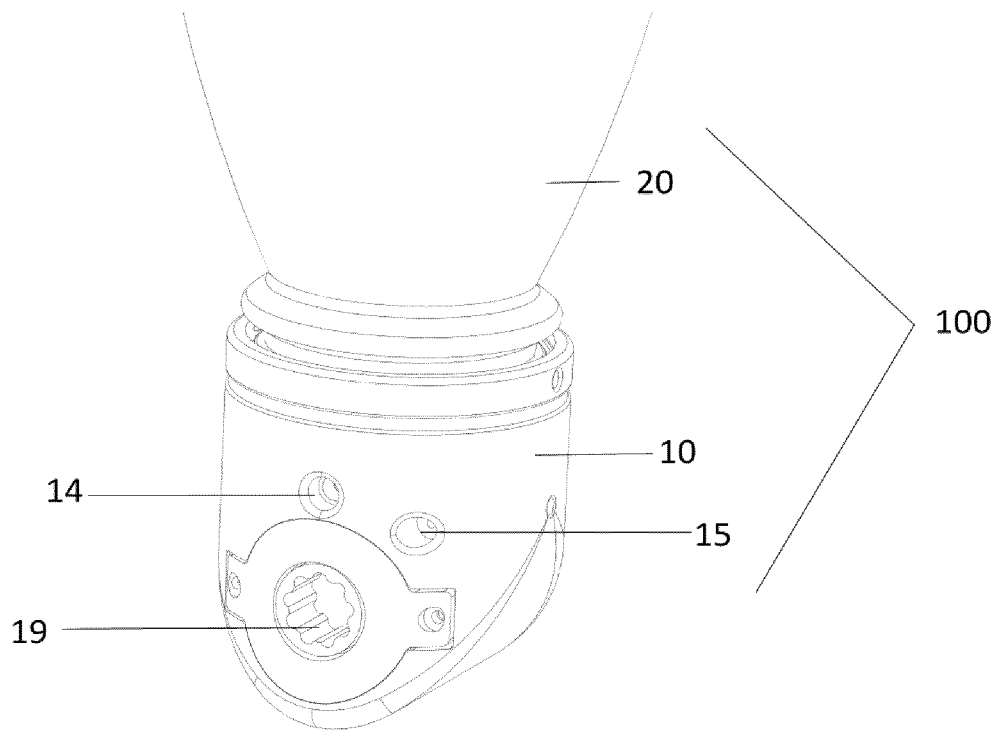
FIG. 1 shows a schematic view of the main components of the disposable foaming device of the invention, according to a horizontal embodiment.
Figure 2:
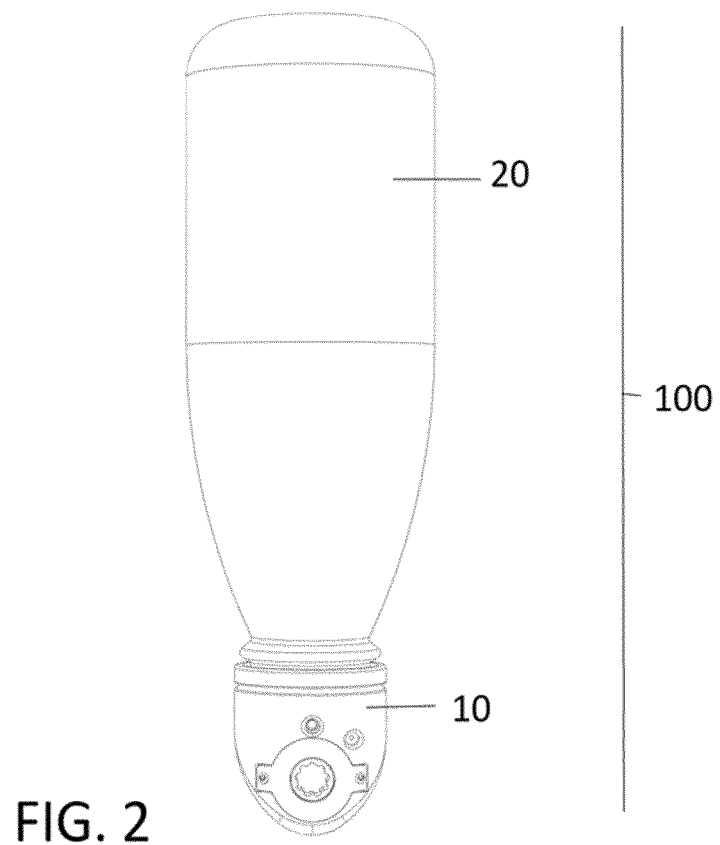
FIG. 2 shows a schematic frontal view of the main components of the disposable foaming device of the invention, according to a horizontal embodiment.
Figure 3:
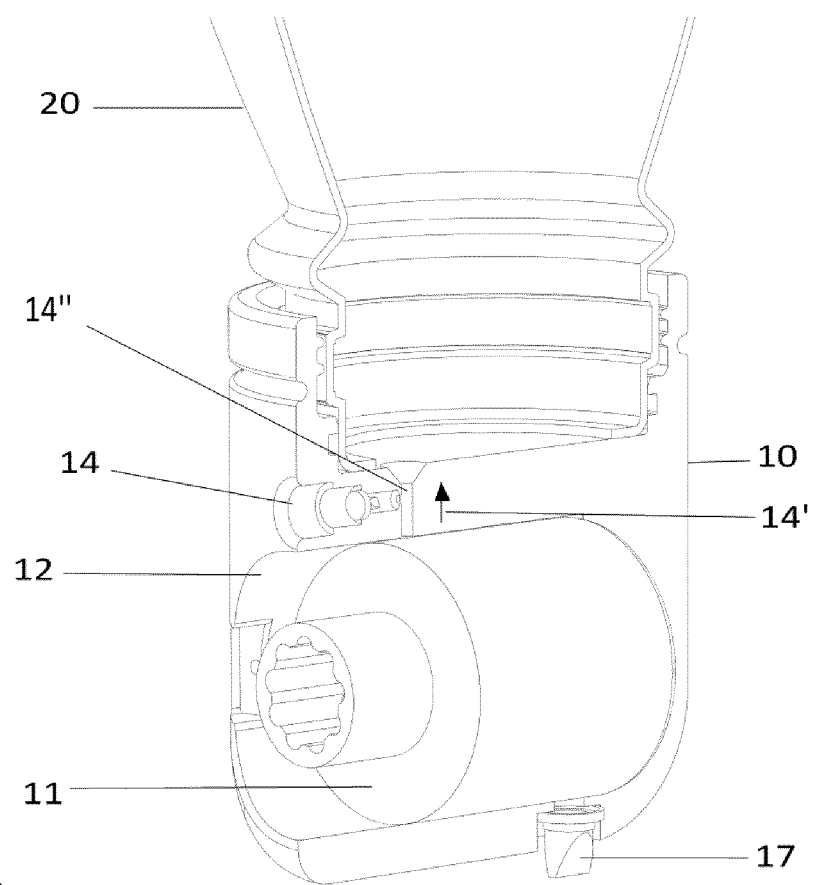
FIG. 3 shows a cross-section view of the foaming compartment and the container compartment of the disposable foaming device of the invention, according to a horizontal embodiment.
Figure 4:
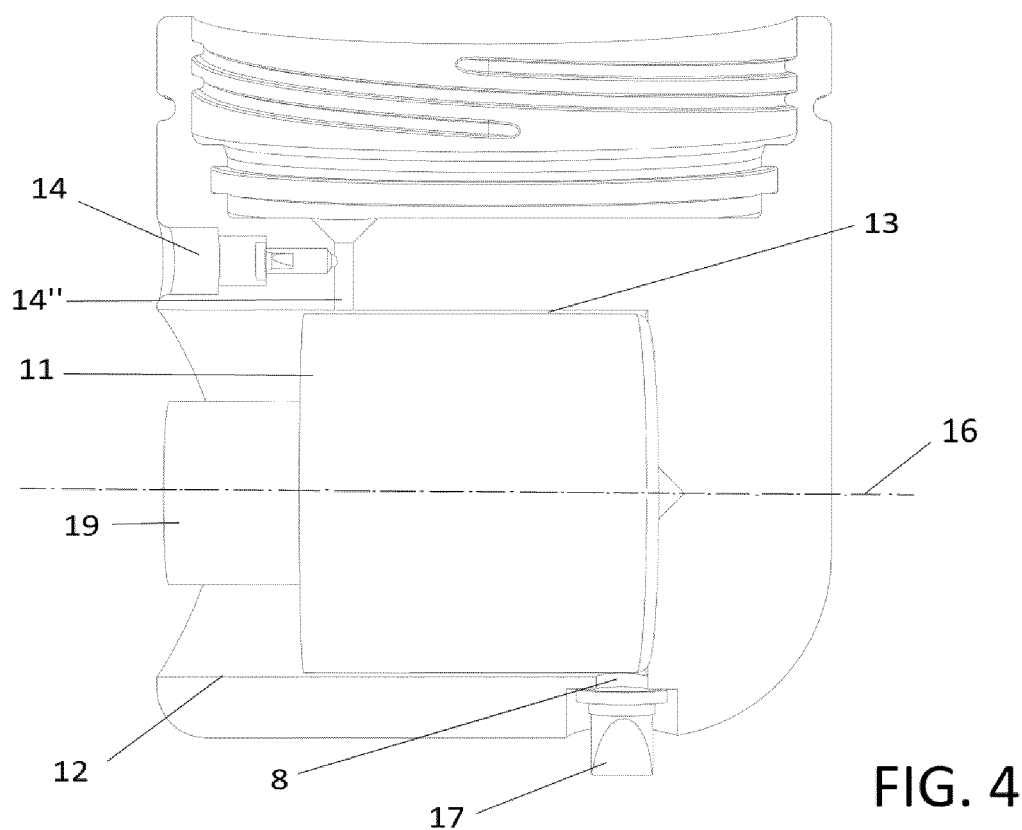
FIGS. 4 and 5 show cross-section detailed views of the foaming compartment of the disposable foaming device of the invention, according to a horizontal embodiment.
Figure 5:
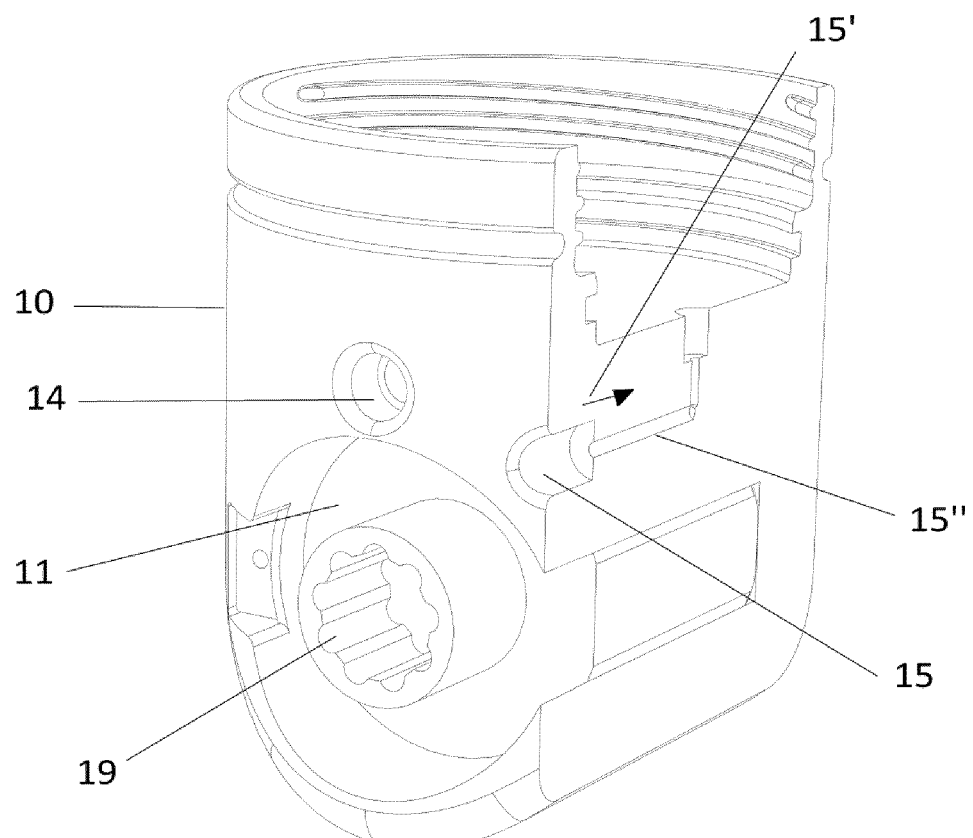

The disposable foaming device 100 according to the present invention comprises a foaming compartment 10 and a container compartment 20. The foaming compartment 10 is designed for foaming a fluid 1 which is stored in the container compartment 20. Typically, the fluid 1 processed in the device of the invention is milk, though any kind of foamable fluid can be used, such as cream, yoghurt, ice-cream mix, etc.

In a preferred embodiment of the invention, the foaming compartment 10 is configured as a lid or cap and the container compartment 20 is configured as a bottle, as a capsule or as a pouch, for example. However, it is clear that any other possible embodiment of the invention would also be comprised within the scope of the present patent application and within the scope of the attached claims.

The foaming device 100 of the invention is fully disposable, so no cleaning operations are needed. The foaming device 100 allows a plurality of foaming operations, typically until the container compartment 20 has been emptied of fluid 1. Between the different foaming applications carried out, the foaming device 100 is conserved in a proper conservation area, typically in a refrigerator. Between the applications, the container compartment 20 can either be kept pressurized or can be depressurized after each use. In any of these cases, any leakage of fluid from the container compartment 20 must be avoided.

The foaming device 100 of the invention is designed in such a way that a mixture of fluid and air is passed at least partly by Couette flow through the foaming compartment 10. Couette flow refers to a laminar flow of a viscous fluid in the space between two parallel plates, such that one plate is moving relative to the other. The flow is driven by shear force acting on the fluid comprised between the two plates, such that foaming energy is provided through high shear energy to this fluid, which is emulsified.

The foaming compartment 10 typically comprises an inner cylinder 11 arranged concentrically within an outer cylinder 12 movable relative to each other, such that a gap 13 is arranged in the space between the outer cylinder 12 and the inner cylinder 11. Preferably, the inner cylinder 11 is a rotor and the outer cylinder 12 is a stator, the rotor being preferably rotated against the fixed stator. The inner cylinder 11 is connectable to driving means 31 (preferably a motor) through connecting means 19, which rotate the inner cylinder 11 with respect to the outer cylinder 12, at a given rotational speed.

The foaming compartment 10 also comprises a primary air inlet 14 and a secondary air inlet 15, each linked to a primary channel 14" and to a secondary channel 15", respectively. The primary air inlet 14 conveys primary incoming air 14' through the primary channel 14" towards the container compartment 20, such that the container compartment 20 is pressurized, typically to a pressure of up to 1 bar: a positive pressure is created inside the container compartment 20 with the aid of a valve 21, so that the fluid 1 pressurized is conveyed rapidly towards the foaming compartment 10 through action of the valve 21. When delivering fluid 1 from the container compartment 20 into the foaming compartment 10, the container compartment 20 is pressurized, for two reasons: 1) because pressure is the driver which allows the fluid 1 to flow into the foaming compartment, and 2) because the foaming is carried out better and more efficiently. The secondary air inlet 15 provides secondary incoming air 15' through the secondary channel 15" which is added to the fluid 1 coming from the container compartment 20 to form a mixture of fluid and air which is then emulsified under the Couette flow principle inside the gap 13 between the rotatable inner cylinder 11 and the outer cylinder 12. As soon as the emulsified fluid and air mixture leaves the gap 13, it expands, so that a foaming effect is achieved as the size of the air bubbles within the fluid increases abruptly, and foam can be then provided through a fluid outlet 17. The two plates in the Couette flow principle are arranged in practice in the foaming device 100 by the outer wall of the inner cylinder 11 and the inner wall of the outer cylinder 12, rotatable with respect to each other, the inner cylinder 11 and the outer cylinder 12 having a common rotation axis 16.

According to another embodiment of the invention, the container compartment 20 can comprise an internal flexible part, comprising the fluid 1 to be foamed, contoured by and external rigid part configuring the outer frame of the container compartment 20. In this configuration, the primary air inlet 14 would convey primary incoming air 14' through the primary channel 14" towards the gap formed between the internal flexible part and the external rigid part of the container compartment 20. The air provided in this gap would then exert pressure over the internal flexible part thus allowing the flow of fluid into the foaming compartment 10. Typically, the internal flexible part would be a flexible bag, preferably made in plastic material, and the external rigid part would be made as a bottle. This configuration provides the following advantages:

- the fluid is never in contact with the primary incoming air 14', as the flexible internal part shrinks according to the decreasing of the fluid contained in it, which minimizes any possibility of fluid oxidation;
- the container compartment 20 can be depressurized after each use, as there is no need to maintain pressure in the gap between the internal flexible part and the external rigid part because there is no leakage of fluid: this would allow the simplification of the valve 21.

Optionally, the foaming device 100 of the invention further comprises a heater (not shown) for heating the mixture of fluid and air in the foaming compartment 10, which enhances the foaming effect due to additional available energy provided. Further, hot milk foam is for example typically desired for preparing beverages. The heater is preferably provided in the machine 30 and is connected to the fluid outlet 17 so that foam is heated after being formed: moreover, there is no contact between the foam and the machine 30 to enhance the cleanliness of the system according to the invention.

The heater can also be integrated within one of the two cylinders 11 or 12. For, example, the heater can be housed inside the inner cylinder 11: when the inner cylinder 11 is further made of a heat conducting material, preferably a metal, heat is efficiently transferred to the outer surface of the inner cylinder 11, defining the gap 13 and therefore efficiently heating up the mixture of fluid and air flowing through the mentioned gap 13. Preferably, the heater heats the cylinder surface along the complete length (i.e. the height) of the inner cylinder 11.

According to another embodiment of the invention, the foaming device 100 can further comprise an additive compartment 50, typically also disposable, preferably attached to the foaming compartment 10 in a releasable way. The foaming compartment 10 comprises an additive air inlet 51, coming from a machine 30, allowing pressurized air to be injected into the additive compartment 50 coming from an additive air outlet 56 so that the additive comprised in the additive compartment 50 is driven through the additive outlet 52 simultaneously together with the foam provided through the fluid outlet 17. An additive inlet valve 53 is provided in the additive compartment 50, regulating the flow of air into the additive compartment 50. The additive compartment 50 comprises attaching means 55 allowing the additive compartment 50 to be plugged on the foaming compartment 10 in a releasable way. Typically, the attaching means 55 comprise sliding means allowing the additive compartment 50 to be plugged and guided on the foaming compartment 10, even when the foaming device 100 is connected to the machine 30.

It is to be noted that the additive compartment 50 of the invention is a passive or slave element of the foaming device 100 and of the machine 30, in the sense that the ratio of the additive quantity with respect to the foam provided and the timing during which delivery of the additive occurs are both commanded by the control means 36 or by the user operating the machine 30. Moreover, additive air 18' driving the additive is pushed by a third air pump 37 in the machine 30, driven through an additive channel 18" in the foaming compartment 10, as it will be further explained: therefore, a given additive compartment 50 is only able to work with a dedicated foaming compartment 10, i.e., with a dedicated foaming device 100.

The foaming device 100 of the invention is connectable to a machine 30, this machine 30 comprising the following elements linked to the foaming device 100:

- driving means 31, typically a motor, comprising a mechanical connection adapted to be connected to the connecting means 19 and to drive in rotation the inner cylinder 11 of the foaming compartment 10;
- a primary air pump 34 connectable to the primary air inlet 14 providing primary incoming air 14';
- a secondary air pump 35 connectable to the secondary air inlet 15 providing secondary incoming air 15'; and
- optionally, a third air pump 37 connectable to an additive air inlet 51 in the foaming compartment 10 providing additive air 18' through an additive channel 18" into the additive compartment 50.

Optionally, the machine 30 can also comprise control means 36 which will manage and control the foaming process parameters in the foaming device 100, as it will be further explained in detail. As an alternative, it is also possible that the machine 30 comprises no control means 36, meaning that the user will then adjust manually part or all of the parameters of the foaming process in the foaming device 100.

The type of foam obtained from a fluid primary depends on the type of fluid which is foamed. When foaming milk, for example, the type of foam obtained varies depending on the type of milk used, such as raw whole milk, pasteurized homogenized full-cream milk, pasteurized skim milk, UHT homogenized full-cream milk, UHT skim milk, etc. For a given type of milk, leaving apart the processing conditions used during its manufacture, foaming properties are largely determined by the temperature at which milk is foamed and by its fat content. In general, low fat milk foams better at low temperatures: this also applies to both whole milk and cream, although to a lower extent. At temperatures of about 37° C. up to about 71° C., this trend is reversed and milky products with higher fat content exhibit a high volume of foam produced at any given point.

On the other hand, the quality of fluid foam is determined by foam properties, such as: quantity and size of the air bubbles formed in the fluid structure once foamed; foam stability, defined as the amount of foam which is stable, i.e., which substantially keeps its volume, usually expressed as the time required for 50% of the fluid to drain from the foam (the time required for reaching a 50% reduction in the foam volume), and foaming level defined as the ratio of the volume of fluid entering the foaming compartment 10 with respect to the volume of foam provided by the fluid outlet 17 (also known as foam overrun, which is defined as the increase in volume in a certain initial volume of fluid by the effect of foaming).

Therefore, for a given type of fluid 1 (i.e., the fat content and the processing conditions during the fluid manufacture are fixed values), the properties of the foam obtained (quantity/size of bubbles, stability and overrun) for this fluid 1 will be determined by the foaming process carried out in the foaming device 100 of the invention, specifically by the process parameters detailed as follows.

Fluid flow rate passing from the container compartment 20 into the foaming compartment 10 through the valve 21: this flow rate is controlled by the primary air pump 34 and therefore determined by the rate of primary incoming air 14' injected in the container compartment 20.

Rotational speed of the inner cylinder 11 (rotor), controlled by the driving means 31.

Amount of secondary incoming air 15' provided into the foaming compartment 10, controlled by the secondary air pump 35.

Optionally, temperature of the foam exiting the fluid outlet 17 or of the mixture of fluid and air in the gap 13 within the foaming compartment 10, controlled by the heater.

Optionally, when an additive compartment is used, the ratio of the additive quantity with respect to the foam provided is controlled by the third air pump 37, which provides additive air 18' through the additive channel 18" into the additive compartment 50.

In the Couette flow effect carried out in the foaming device 100 of the invention, the shear stress experienced by the mixture of fluid and air in the foaming compartment 10 depends largely on the width of the gap 13 formed between the external wall of the inner cylinder 11 and the internal wall of the outer cylinder 12. According to the invention, the disposable foaming device 100 has a given width of the gap 13, which is chosen depending on the type of fluid 1 in the container compartment 20 which is to be foamed, chosen in such a way that optimal foaming effect by shear (Couette flow) is obtained. Typically, the width of the gap 13 is larger as more viscous the fluid 1 to be foamed is: for example, milk would require a much smaller gap 13 than liquid yogurt. Preferably, the width of the gap 13 when the fluid is milk would be around 0.3 mm and this value would be of around 0.4 mm when the fluid is liquid yogurt.

Preferably, the driving means 31 (typically, a motor) are adapted to rotate the inner cylinder 11 with a rotational speed in a range of 4000 to 8000 rpm with respect to the outer cylinder 12. These preferred values for the rotational speed have been found to yield the best foaming effect, meaning that the foam provided has optimal foaming properties. What is important for the Couette flow effect is that there exists a relative rotational speed between the inner cylinder 11 and the outer cylinder 12, leading to a shear-driven fluid motion in the gap 13. Typically, this is achieved by fixing the outer cylinder 12 and rotating the inner cylinder 11 with the mentioned speed values, or vice versa. The relative rotational speed can also be achieved by rotating the two cylinders in opposite senses with respect to each other.

Preferably, according to the invention, the foaming device 100 also comprises a code 40, typically a bar code, which can be arranged either on the container compartment 20 or on the foaming compartment 10. The code 40 comprises the information of at least one of the following process parameters, detailed below, which is provided to the control means 36 in the machine 30 to carry out the foaming process in an optimal way.

Fluid flow rate passing from the container compartment 20 into the foaming compartment, which is a function of the pressure in the container compartment 20.

Rotational speed of the inner cylinder 11.

Amount of secondary incoming air 15' provided into the foaming compartment 10.

Temperature of the foam exiting the fluid outlet 17 or of the mixture of fluid and air in the gap 13, to be provided by the heater.

Optionally, when an additive compartment 50 is used, the ratio of the additive quantity with respect to the foam provided.

When the machine 30 does not comprise control means 36, the user can then adjust at least one of the above-mentioned parameters, as desired.

According to one embodiment of the invention, shown in FIGS. 1 to 5, the foaming compartment 10 (i.e., the inner cylinder 11 and the outer cylinder 12) is arranged perpendicularly to the container compartment 20 (the rotation axis 16 of the foaming compartment 10 is perpendicular to the main axis of the container compartment 20)), in what is called a horizontal arrangement In this horizontal arrangement, the small gap 13 provides high shear stress to the mixture of fluid and air flowing through the foaming compartment 10 as the inner cylinder 11 rotates with respect to the outer cylinder 12. Therefore, the mixture is emulsified in this gap 13. When this emulsified mixture flows into a vertical path 8, the mixture is expanded, and therefore is foamed outside the gap area.

Figure 6:
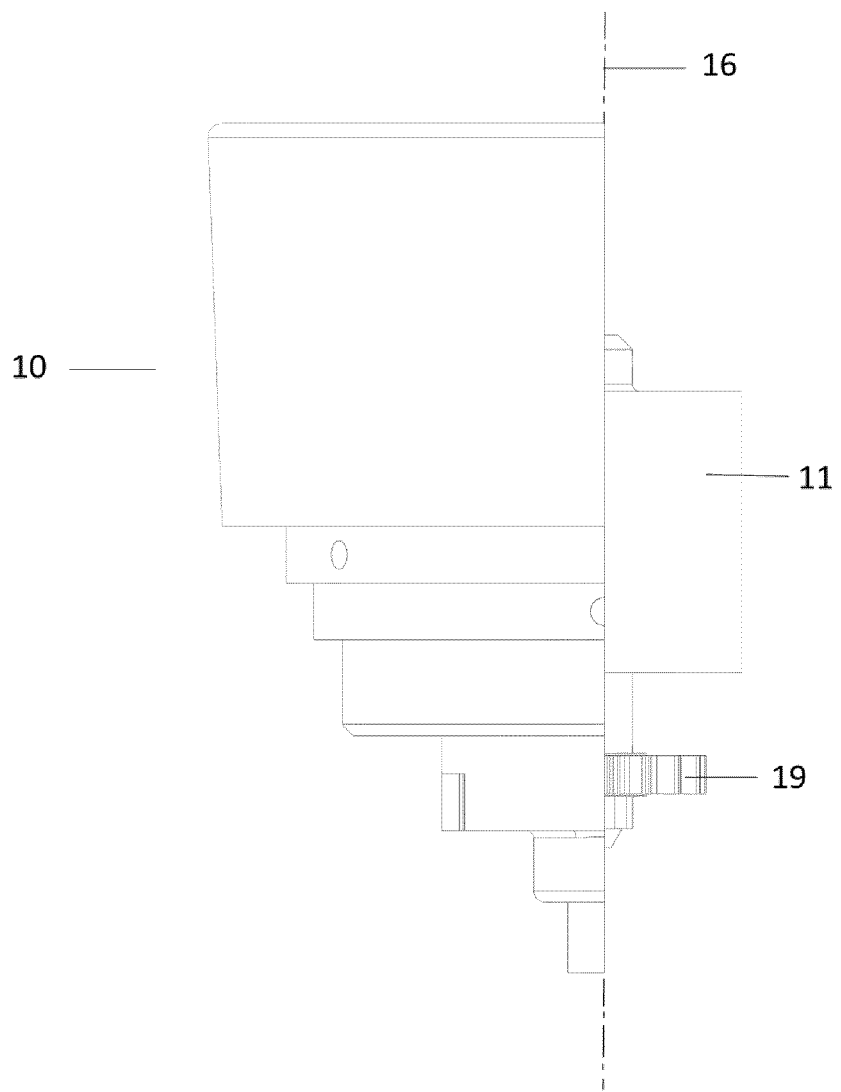
FIG. 6 shows a cross-section view of the foaming compartment of the disposable foaming device of the invention, according to a vertical embodiment.
Figure 7:
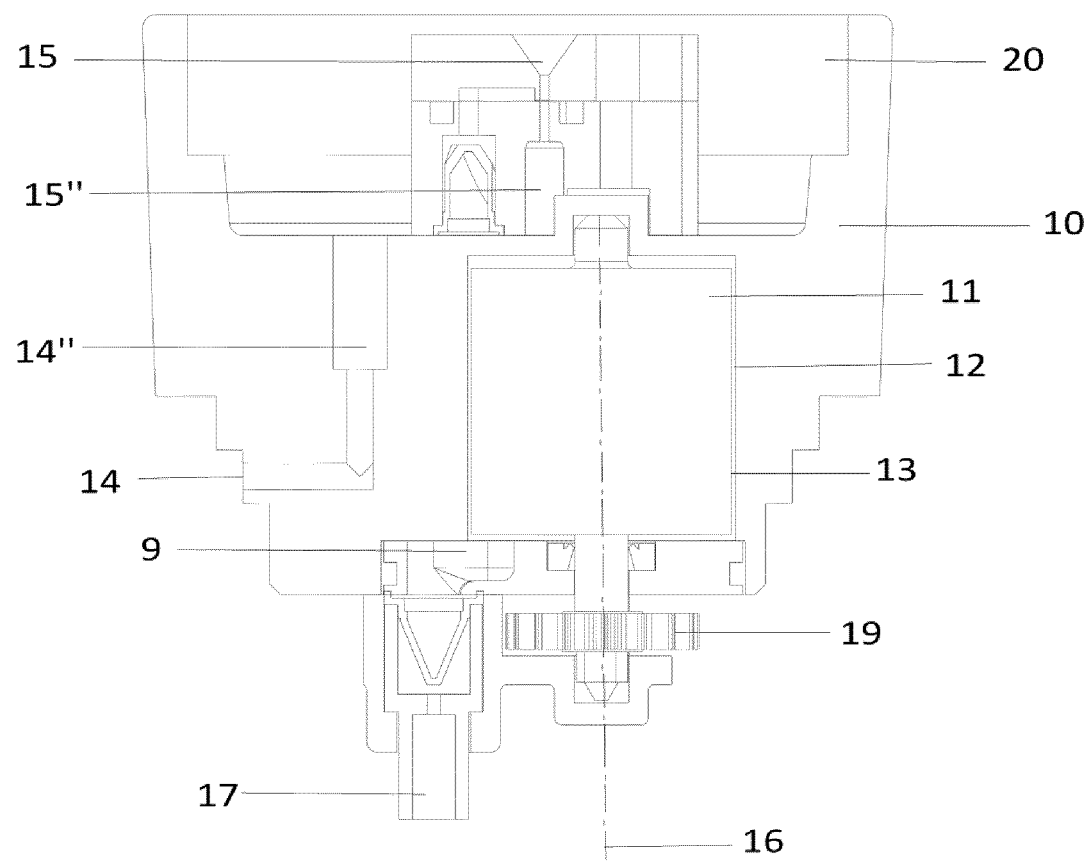
FIG. 7 shows a detailed cross-section view of the foaming compartment of the disposable foaming device of the invention, according to a vertical embodiment.
Figure 8:
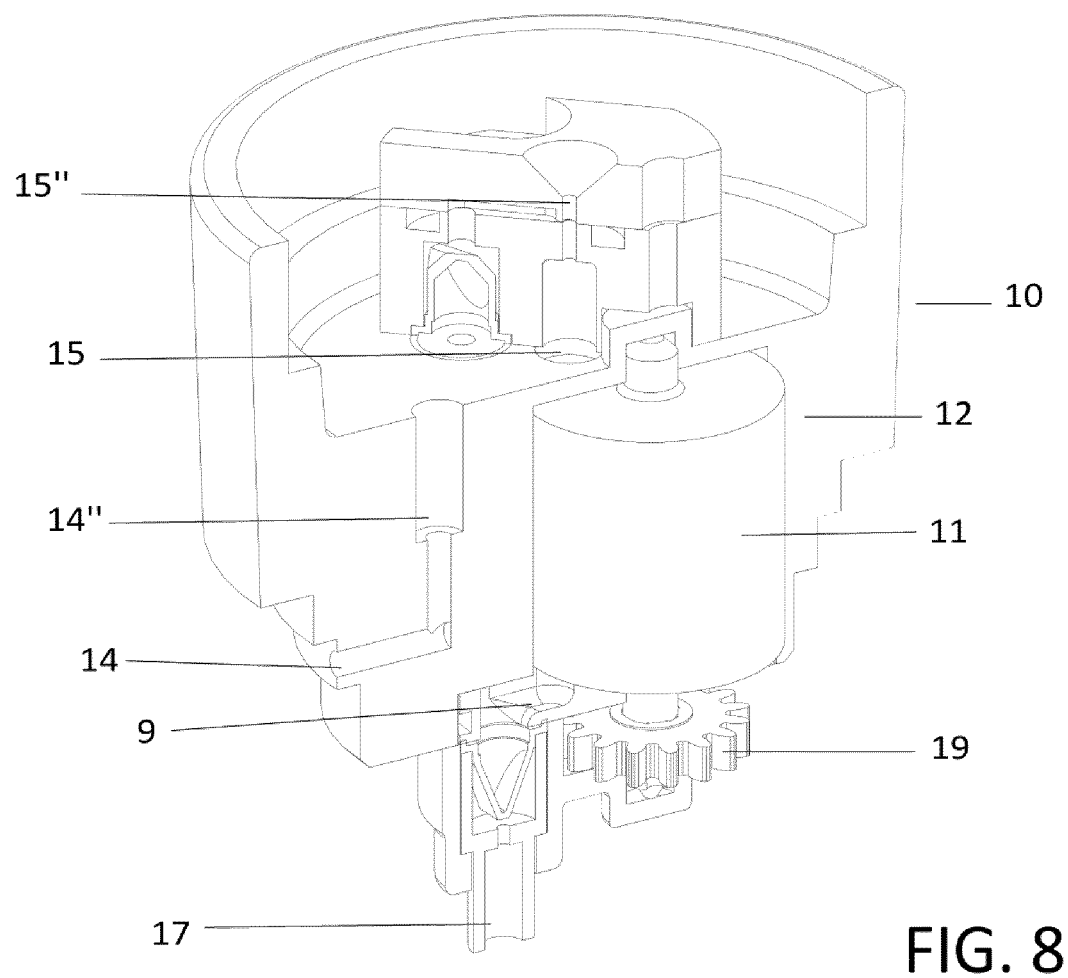
FIG. 8 shows a detailed view of the foaming compartment of the disposable foaming device of the invention, according to a vertical embodiment.
Figure 9:
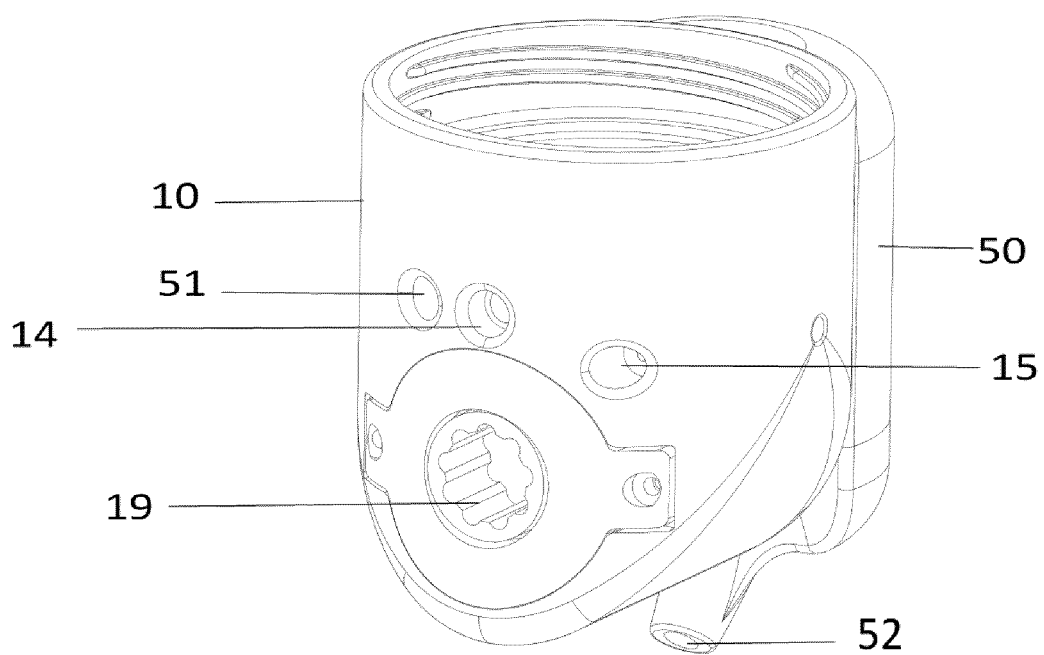
FIG. 9 shows a schematic view of the additive compartment attached to the foaming compartment in a horizontal embodiment of the disposable foaming device according to the invention.
Figure 10:
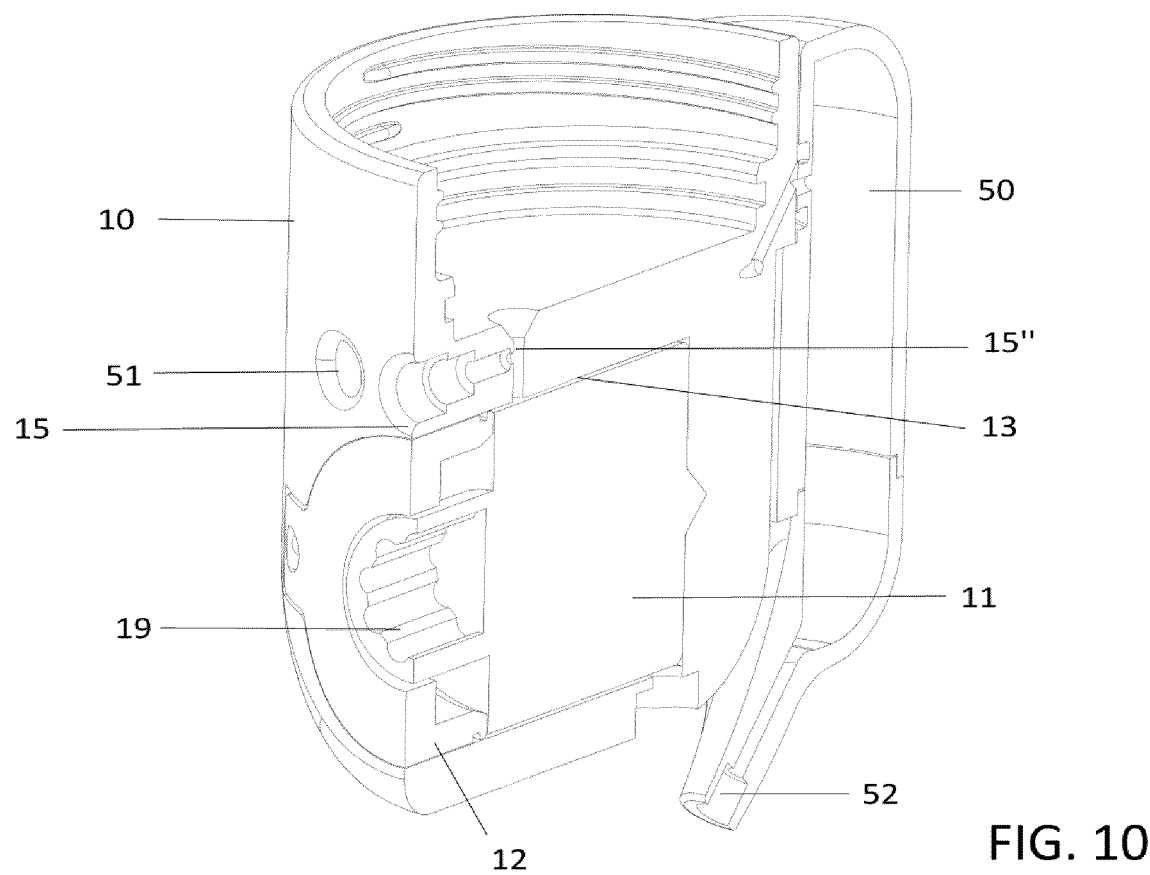
FIG. 10 shows a cross-sectional view of the additive compartment attached to the foaming compartment in a horizontal embodiment of the disposable foaming device according to the invention.
Figure 11:
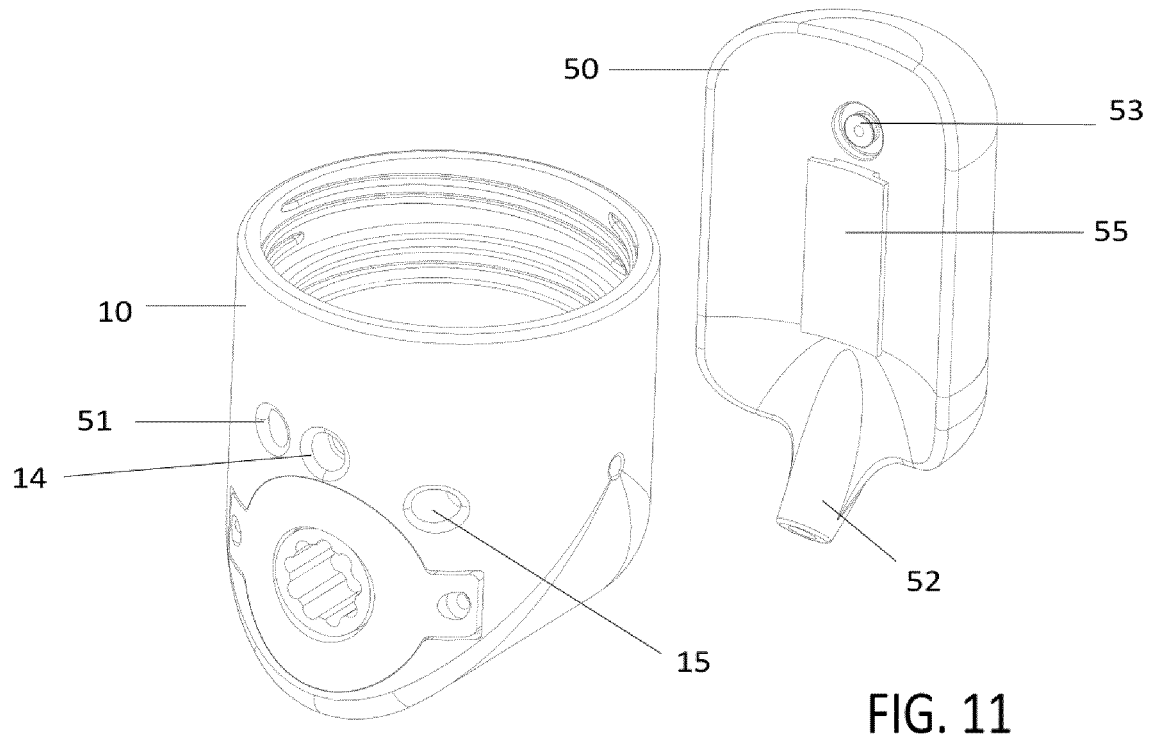
FIG. 11 shows a frontal view of the additive compartment and of the foaming compartment, before being attached to each other, in a horizontal embodiment of the disposable foaming device according to the invention.
Figure 12:
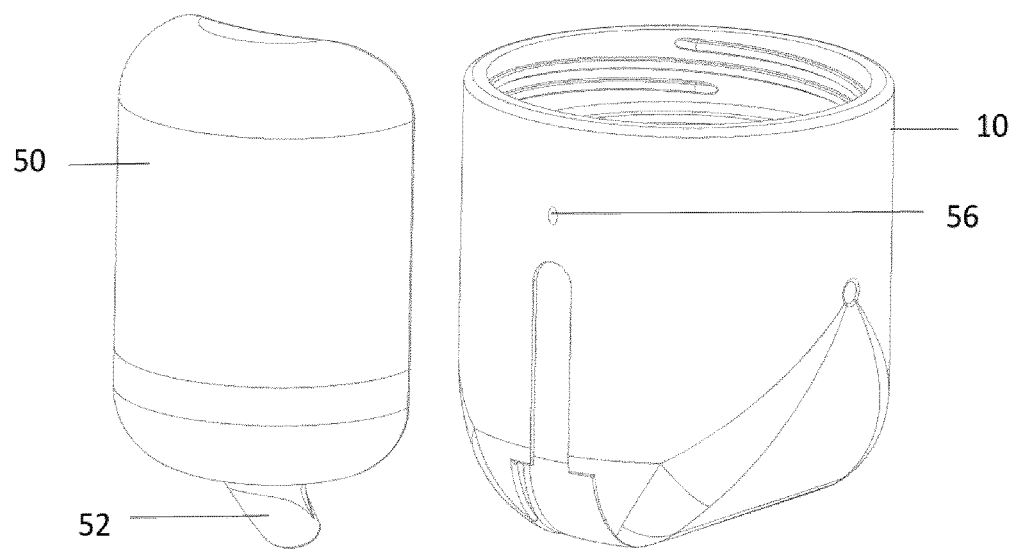
FIG. 12 shows a rear view of the additive compartment and of the foaming compartment, before being attached to each other, in a horizontal embodiment of the disposable foaming device according to the invention.
Figure 13:
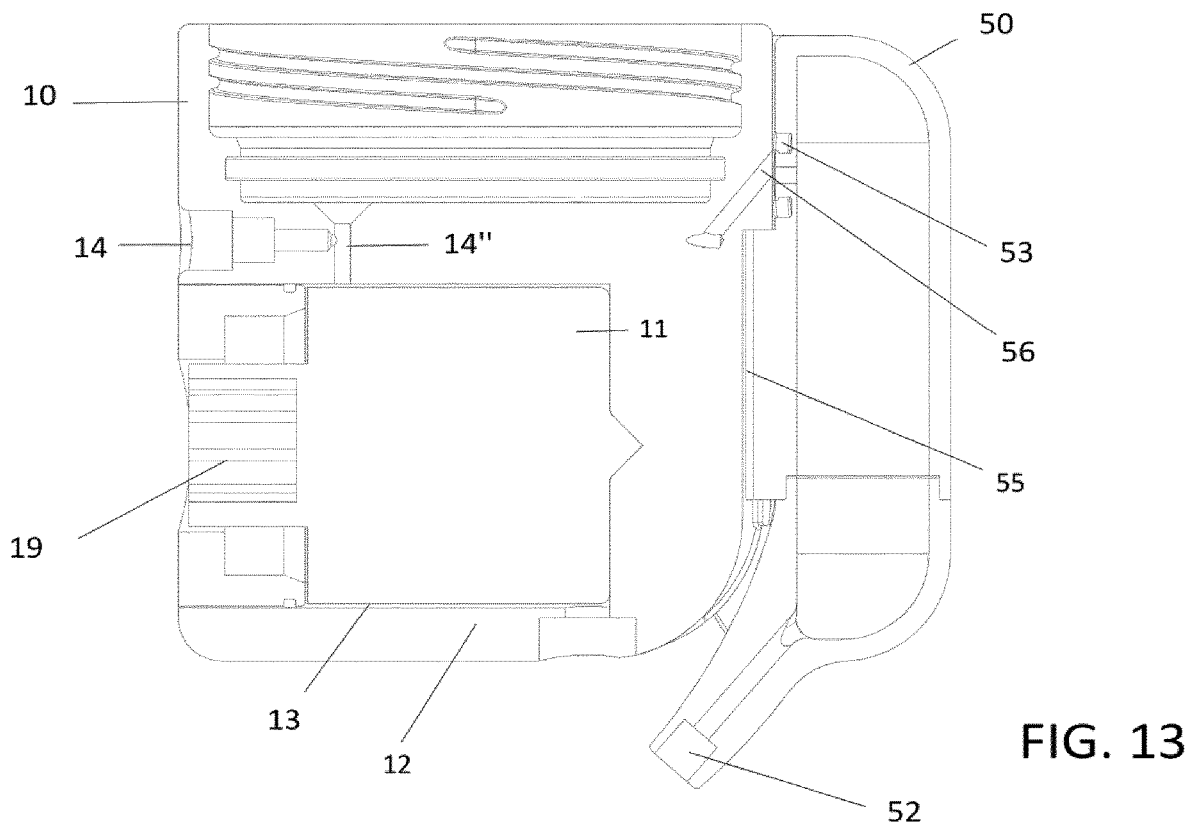
FIG. 13 shows a detailed cross-section view of the additive compartment and of the foaming compartment, attached to each other, in a horizontal embodiment of the disposable foaming device according to the invention.
Figure 14:
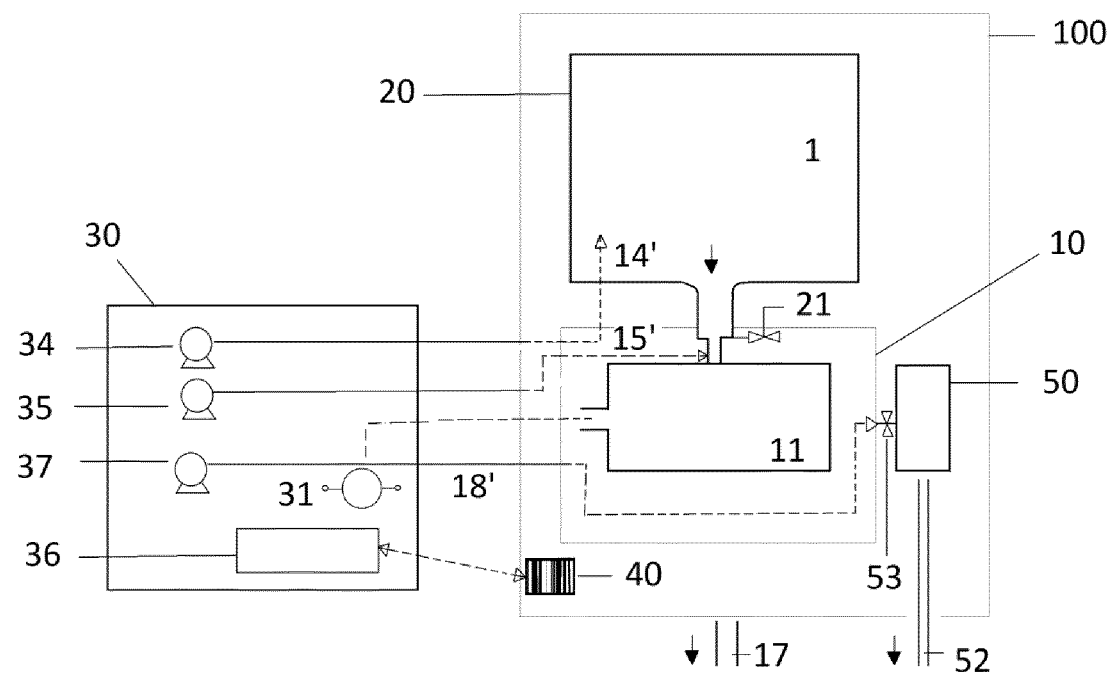
FIG. 14 shows a schematic functional diagram showing a foaming system according the present invention, comprising a disposable foaming device connected to a machine, the disposable foaming device comprising a foaming compartment, a container compartment and an additive compartment.

According to another embodiment of the invention, shown in FIGS. 6-8, the foaming compartment 10 (i.e., the inner cylinder 11 and the outer cylinder 12) is arranged parallel to the container compartment 20 (the rotation axis 16 of the foaming compartment 10 is parallel to the main axis of the container compartment 20), in what is called a vertical arrangement. In this vertical arrangement, the small gap 13 provides high shear stress to the mixture of fluid and air flowing through the foaming compartment 10 as the inner cylinder 11 rotates with respect to the outer cylinder 12. Therefore, the mixture is emulsified in this gap 13. When this emulsified mixture flows into a secondary vertical path 9, the mixture is expanded, and therefore is foamed outside the gap area.

Figure 15:
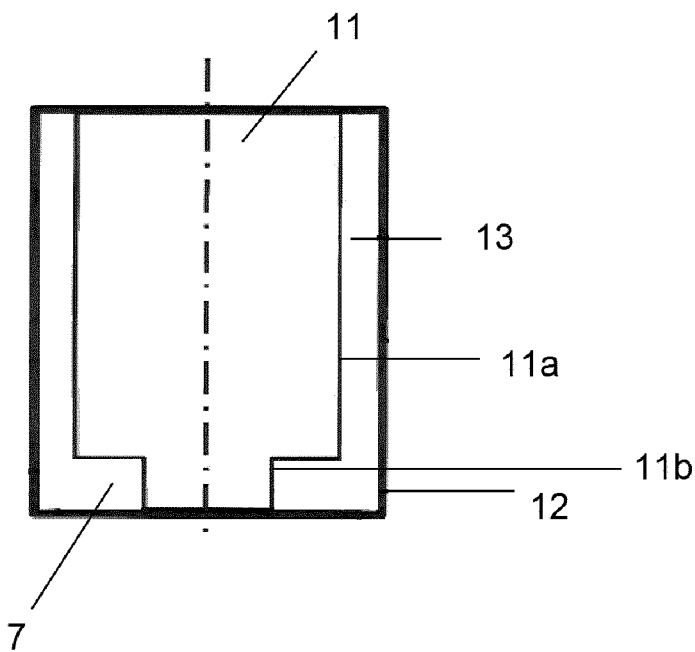
FIG. 15 shows a cross-section view of another possible embodiment of the disposable foaming device of the invention, according to a vertical embodiment.

As schematically shown in FIG. 15, the inner cylinder 11 can comprise a first part 11a and a second part 11b, the diameter of the first part 11a being larger than the diameter of the second part 11b. The value of the diameter of the first part 11a is chosen such that a certain gap 13 of a given width is formed between the first part 11a and the outer cylinder 12, which would determine the shear stress provided to the mixture of air and fluid in the cited gap 13 and therefore the emulsifying of this mixture. The diameter of the second part 11b of the inner cylinder 11 is designed such that a chamber 7 is formed between the second part 11b and the outer cylinder 12, wherein the chamber 7 has a width such that a proper expansion and therefore foaming of the mixture of fluid and air occurs in an optimal way. The mixture of fluid and air provided in the foaming compartment 10 flowing through the gap 13 is emulsified due to the high shear stress experienced in the narrow gap 13 between the inner cylinder 11 and the outer cylinder 12, when the inner cylinder 11 is rotated with respect to the outer cylinder 12. When the emulsified mixture of fluid and air flows out of the gap 13 into the chamber 7, the mixture is expanded and consequently foamed. Due to the expansion, the foam is pressed out of the fluid outlet 17. When the diameter of the fluid outlet 17 is made larger than that of the chamber 7, the mixture of fluid and air is foamed to a higher extent. A similar arrangement to this one just described could also be implemented in the horizontal arrangement described above.

It should be noted that, even when FIGS. 9-13 attached show one possible embodiment where the additive compartment 50 is attached to the foaming compartment 10 having an horizontal arrangement, it would be also possible to attach the additive compartment 50 to the foaming compartment 10 when the foaming compartment 10 is in the vertical arrangement, in a similar way as the one shown in FIGS. 9-13.

Typically, a complete foaming system is configured, comprising a foaming device 100 and a machine 30. Typically, the foaming device 100 would comprise a foaming compartment 10, a container compartment 20, optionally a code 40 and, also optionally, an additive compartment 50.

Although the present invention has been described with reference to preferred embodiments thereof, many modifications and alterations may be made by a person having ordinary skill in the art without departing from the scope of this invention which is defined by the appended claims.

LIST OF REFERENCES

100 Disposable foaming device
10 Foaming compartment
11 Inner cylinder
11a First part
11b Second part
7 Chamber
8 Vertical path
9 Secondary vertical path
12 Outer cylinder
13 Gap between inner and outer cylinder
14 Primary air inlet
14' Primary incoming air
14" Primary channel
15 Secondary air inlet
15' Secondary incoming air
15" Secondary channel
16 Rotation axis
17 Fluid outlet
18' Additive air
18" Additive channel
19 Connecting means
51 Additive air inlet
56 Additive air outlet
20 Container compartment
1 Fluid
21 Valve
40 Code
50 Additive compartment
52 Additive outlet
53 Additive inlet valve
55 Attaching means
30 Machine
31 Driving means
34 Primary air pump
35 Secondary air pump
36 Control means
37 Third air pump

The invention claimed is:

1. A disposable foaming device for foaming a fluid, the disposable foaming device comprising a container compartment and a foaming compartment,
   the container compartment being pressurized by primary incoming air so that the fluid is driven into the foaming compartment,
   wherein the foaming compartment is provided with secondary incoming air to be mixed with the fluid coming from the container compartment,
   the foaming compartment comprising an inner cylinder and an outer cylinder arranged concentrically to form a gap extending from the inner cylinder to the outer cylinder,
   the inner cylinder being rotatable with respect to the outer cylinder that creates shear stress to emulsify a mixture of the air and the fluid in the gap of the foaming compartment when the mixture of the air and the fluid is driven into the gap, the outer cylinder is stationary, and the inner cylinder rotates at a speed of between 4000 to 8000 rpm with respect to the outer cylinder,
   the foaming compartment comprises (i) a primary air inlet linked to a primary channel and (ii) a secondary air inlet linked to a secondary channel, the primary air inlet configured to convey the primary incoming air through the primary channel towards the container compartment, such that the container compartment is pressurized;
   wherein the secondary air inlet is configured to convey the secondary incoming air through the secondary channel to a position upstream of the foaming compartment such that the secondary incoming air is mixed with the fluid coming from the container compartment at the position upstream of the foaming compartment, the mixture provided to the foaming compartment.

2. The disposable foaming device according to claim 1, wherein a width of the gap is a function of the fluid to be foamed, such that the shear stress in the gap emulsifies the mixture of the air and the fluid.

3. The disposable foaming device according to claim 1, wherein the foaming compartment is a lid, and the container compartment is a structure selected from the group consisting of a bottle, a capsule and a pouch.

4. The disposable foaming device according to claim 1, wherein the container compartment comprises an internal flexible part comprising the fluid to be foamed, the container compartment further comprising an external surrounding rigid part, the container compartment configured to form a secondary gap between the internal flexible part and the external surrounding rigid part so that the primary incoming air is driven into the secondary gap, pressing the internal flexible part to drive the fluid into the foaming compartment.

5. The disposable foaming device according to claim 1, wherein the foaming device is arranged perpendicularly with respect to the container compartment, the foaming compartment being further provided with a vertical path to where the mixture of the air and the fluid is conveyed for being expanded and therefore foamed.

6. The disposable foaming device according to claim 1, wherein the foaming device is arranged parallel with respect to the container compartment, the foaming compartment being further provided with a secondary vertical path to where the emulsified mixture of air and the fluid is conveyed for being expanded and therefore foamed.

7. The disposable foaming device according to claim 1, comprising a disposable additive compartment releasably attached to the foaming compartment, the disposable additive compartment configured to deliver an additive flow from pressure exerted by additive air coming from the foaming compartment.

8. The disposable foaming device according to claim 1, wherein the foaming compartment comprises a heater configured for heating the mixture of the fluid and the air to enhance the emulsifying process in the foaming compartment through adding energy provided from the heater.

9. The disposable foaming device according to claim 1, wherein the fluid is a foamable fluid.

10. The disposable foaming device according to claim 1, wherein the inner cylinder is a rotor, and the outer cylinder is a stator.

11. The disposable foaming device according to claim 1, wherein the inner cylinder is made of a heat conducting material.

12. A foaming system comprising a foaming device for foaming a fluid,
the foaming device comprising a container compartment and a foaming compartment,
the container compartment being pressurized by primary incoming air so that the fluid is driven into the foaming compartment,
wherein the foaming compartment is provided with secondary incoming air to be mixed with the fluid coming from the container compartment,
the foaming compartment comprising an inner cylinder and an outer cylinder arranged concentrically, to form a gap extending from the inner cylinder to the outer cylinder,
the inner cylinder being rotatable with respect to the outer cylinder that creates shear stress to emulsify a mixture of the air and the fluid in the gap of the foaming compartment when the mixture of the air and the fluid is driven into the gap, the outer cylinder is stationary, and the inner cylinder rotates at a speed of between 4000 to 8000 rpm with respect to the outer cylinder,
the system further comprising a machine, the foaming device being connectable to the machine, and the machine comprising a drive member configured to rotate the inner cylinder, the machine further comprising a primary air pump providing the primary incoming air and a secondary air pump providing the secondary incoming air, the foaming compartment comprises (i) a primary air inlet linked to a primary channel and (ii) a secondary air inlet linked to a secondary channel, the primary air inlet configured to convey the primary incoming air through the primary channel towards the container compartment, such that the container compartment is pressurized;
wherein the secondary air inlet is configured to convey the secondary incoming air from the secondary air pump through the secondary channel to a position upstream of the foaming compartment such that the secondary incoming air is mixed with the fluid coming from the container compartment at the position upstream of the foaming compartment.

13. The foaming system according to claim 12 comprising a third air pump providing additive air into an additive compartment through the foaming device.

14. The foaming system according to claim 12, wherein the foaming compartment comprises a heater configured for heating the mixture of the fluid and the air, wherein the machine comprises a controller configured to monitor at least one foaming process parameter selected from the group consisting of: a fluid flow rate flowing from the container compartment into the foaming compartment, a rotating speed of the inner cylinder, a flow rate of the secondary incoming air provided into the foaming compartment, a temperature of the mixture of the air and the fluid in the foaming compartment, and a ratio of additive quantity provided from an additive compartment.

15. The foaming system according to claim 14, the foaming device comprises a code with information on the at least one foaming process parameter.

16. The foaming system according to claim 12, wherein the machine comprises a heater configured for heating a foam exiting a fluid outlet of the foaming device.

17. The foaming system according to claim 12, wherein the foaming compartment comprises a heater configured for heating the mixture of the fluid and the air, wherein the machine comprises a controller configured to monitor two or more foaming process parameters selected from the group consisting of: a fluid flow rate flowing from the container compartment into the foaming compartment, a rotating speed of the inner cylinder, a flow of the secondary incoming air provided into the foaming compartment, a temperature of the mixture of the air and the fluid in the foaming compartment, and a ratio of additive quantity provided from an additive compartment.

18. The foaming system according to claim 17, wherein the foaming device comprises a code providing information on the two or more selected foaming process parameters.

* * * * *